US009955129B2

(12) United States Patent
Hashizume (10) Patent No.: US 9,955,129 B2
(45) Date of Patent: Apr. 24, 2018

(54) LIGHT SOURCE DEVICE AND PROJECTOR

(71) Applicant: SEIKO EPSON CORPORATION, Tokyo (JP)

(72) Inventor: Toshiaki Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 59 days.

(21) Appl. No.: 15/176,663

(22) Filed: Jun. 8, 2016

(65) Prior Publication Data
US 2016/0373705 A1 Dec. 22, 2016

(30) Foreign Application Priority Data

Jun. 18, 2015 (JP) ................................. 2015-122788

(51) Int. Cl.
| | | |
|---|---|---|
| *H04N 9/31* | (2006.01) | |
| *G02B 27/14* | (2006.01) | |
| *G02B 27/09* | (2006.01) | |
| *G02B 27/28* | (2006.01) | |

(52) U.S. Cl.
CPC ....... *H04N 9/3158* (2013.01); *G02B 27/0955* (2013.01); *G02B 27/141* (2013.01); *G02B 27/283* (2013.01); *H04N 9/3105* (2013.01)

(58) Field of Classification Search
CPC ... G02B 17/008; G02B 27/141; G02B 3/0006

USPC .............................................. 353/20; 362/19
See application file for complete search history.

(56) References Cited

U.S. PATENT DOCUMENTS

| | | | | |
|---|---|---|---|---|
| 2015/0124223 A1* | 5/2015 | Yamauchi | .......... | G03B 21/2093 353/20 |
| 2016/0349606 A1* | 12/2016 | Nishimori | ............ | G02B 26/008 |

FOREIGN PATENT DOCUMENTS

JP 2013-250494 A 12/2013

* cited by examiner

*Primary Examiner* — Steven H Whitesell Gordon
*Assistant Examiner* — Jerry Brooks
(74) *Attorney, Agent, or Firm* — Oliff PLC (57) ABSTRACT

A light source device according to the invention includes a light source, a light separating/combining element including a dichroic layer, a wavelength conversion layer, and a diffusely reflecting element. A bundle of light beams emitted from the light source includes a first light bundle and a second light bundle. The first light bundle enters the wavelength conversion layer via the dichroic layer. The second light bundle enters the diffusely reflecting element without entering the dichroic layer, and is converted into diffusely reflected light. The dichroic layer combines the third light bundle from the wavelength conversion layer and the diffusely reflected light from the diffusely reflecting element with each other.

15 Claims, 8 Drawing Sheets

LIGHT SOURCE DEVICE AND PROJECTOR

BACKGROUND

1. Technical Field

The present invention relates to a light source device and a projector.

2. Related Art

In recent years, as a light source device for a projector, there has been known a device for combining fluorescence light generated using blue light emitted from a semiconductor laser and blue diffusive light with each other to thereby generate white light (see e.g., JP-A-2013-250494).

In this light source device, the blue light is separated into two parts using a polarization separation property of a dielectric multilayer film to generate the fluorescence light using one of the parts of the blue light thus separated, and the blue diffusive light is generated using the other of the parts of the blue light thus separated. The blue diffusive light is reflected by the dielectric multilayer film to thereby be combined with the fluorescence light, and thus, turns to the white light.

Incidentally, in the light source device described above, there is disposed a lens in the light path of the blue light. The lens component generates heat due to the irradiation with the blue light, a laser beam, and thus expands. Then, the polarization state of the blue light is disturbed due to the photo-elastic effect of the lens, and therefore, there is a possibility that the combination by the dielectric multilayer film cannot be performed in good condition.

SUMMARY

An advantage of some aspects of the invention is to provide a light source device in which the influence of photo-elastic effect is prevented. Another advantage of some aspects of the invention is to provide a projector equipped with such a light source device.

A first aspect of the invention provides a light source device including a light source, a light separating/combining element including a dichroic layer, a wavelength conversion layer, a first pickup lens disposed between the light separating/combining element and the wavelength conversion layer, a diffusely reflecting element, and a second pickup lens disposed between the light separating/combining element and the diffusely reflecting element, wherein a bundle of light beams emitted from the light source includes a first light bundle and a second light bundle, the first light bundle enters the wavelength conversion layer via the dichroic layer to be converted into a third light bundle, the second light bundle enters the diffusely reflecting element, without entering the dichroic layer, to be converted into diffusely reflected light, a wavelength of the third light bundle is different from a wavelength of the diffusely reflected light, and the dichroic layer combines the third light bundle from the wavelength conversion layer and the diffusely reflected light from the diffusely reflecting element with each other.

According to the light source device related to the first aspect of the invention, since the light from the light source is separated without using the polarizer, in the case of combining the third light bundle and the diffusely reflected light with each other, there is no chance of being affected by the photo-elastic effect caused in the second pickup lens.

In the first aspect of the invention described above, it is preferable that the light separating/combining element includes a first region in which the dichroic layer is disposed and a second region in which a reflecting section is disposed, and the second light bundle is reflected by the second region, and enters the diffusely reflecting element.

According to this configuration, by reflecting the second light bundle, it is possible to make the second light bundle preferably enter the diffusely reflecting element regardless of the polarization state.

In the first aspect of the invention described above, it is preferable that the second light bundle constitutes at least a part of an outer edge area of the bundle of light beams.

According to this configuration, the loss of the diffusely reflected light can be reduced compared to the case in which the second light bundle constitutes a central portion of the bundle of light beams.

A second aspect of the invention provides a projector including the light source device according to the first aspect of the invention, an image forming section provided with a plurality of light modulation devices, and adapted to modulate illumination light emitted from the light source device in accordance with image information to form image light, an overlapping optical system disposed in a light path between the light source device and the image forming section, and adapted to overlap the illumination light on each of the light modulation devices, a color separation optical system disposed between the overlapping optical system and the image forming section, and adapted to separate the diffusely reflected light from the illumination light having passed through the overlapping optical system, a relay optical system adapted to guide the diffusely reflected light having been separated by the color separation optical system to a first light modulation device out of the plurality of light modulation devices, and a projection optical system adapted to project the image light, wherein the relay optical system includes a first reflecting element, a relay lens disposed in a subsequent stage of the first reflecting element, and a second reflecting element disposed in a subsequent stage of the relay lens, and assuming that a center axis of the diffusely reflected light entering the first reflecting element is a first center axis, and a center axis of the diffusely reflected light having been reflected by the first reflecting element is a second center axis, and when viewed from a direction perpendicular to a plane including the first center axis and the second center axis, an optical axis of the relay lens is disposed at a position separated from the second center axis of the case in which a principal ray of the diffusely reflected light coincides with a principal ray of the third light bundle.

According to the projector related to the second aspect of the invention, the angle formed by the principal ray of the diffusely reflected light with the first light modulation device can be decreased using the relay optical system. Thus, since the difference between the central angle of the incident angle distribution of the diffusely reflected light in the first light modulation device and the central angle of the incident angle distribution of the colored light in other light modulation devices is decreased, the color variation can be reduced.

In the second aspect of the invention described above, it is preferable that there is further included a field lens disposed between the second reflecting element and the first light modulation device, and the second reflecting element is disposed so that the principal ray of the diffusely reflected light having been reflected by the second reflecting element coincides with an optical axis of the field lens.

According to this configuration, the entire image forming area of the first light modulation device can uniformly be irradiated with the diffusely reflected light.

A third aspect of the invention provides a projector including the light source device according to the first aspect of the invention, an image forming section provided with a plurality of light modulation devices, and adapted to modulate illumination light emitted from the light source device in accordance with image information to form image light, an overlapping optical system disposed in a light path between the light source device and the image forming section, and adapted to overlap the illumination light on each of the light modulation devices, a color separation optical system disposed between the overlapping optical system and the image forming section, and adapted to separate the diffusely reflected light from the illumination light having passed through the overlapping optical system, a relay optical system adapted to guide the diffusely reflected light having been separated by the color separation optical system to a first light modulation device out of the plurality of light modulation devices, and a projection optical system adapted to project the image light, wherein the relay optical system includes a third lens array, a fourth lens array to which the diffusely reflected light having been transmitted through the third lens array is input, and a second field lens adapted to guide the diffusely reflected light having been transmitted through the fourth lens array to the first light modulation device.

According to the projector related to the third aspect of the invention, the angle formed by the principal ray of the diffusely reflected light with the first light modulation device can be decreased using the relay optical system. Thus, since the difference between the incident angle distribution of the diffusely reflected light in the first light modulation device and the incident angle distribution of the colored light in other light modulation devices is decreased, the color variation can be reduced.

In the third aspect of the invention described above, it is preferable that the first light modulation device includes an image forming area, and the second field lens is disposed so that the principal ray of the diffusely reflected light having been transmitted through the second field lens coincides with a center of the image forming area.

According to this configuration, the entire image forming area of the first light modulation device can uniformly be irradiated with the diffusely reflected light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described in detail with reference to the accompanying drawings.

It should be noted that the drawings used in the following explanation show characteristic parts in an enlarged manner in some cases for the sake of convenience of easier understanding of the characteristics, and the dimensional ratios between the constituents and so on are not necessarily the same as actual ones.

First Embodiment

The projector according to the present embodiment is an example of a projector using three transmissive liquid crystal light valves.

Figure 1:
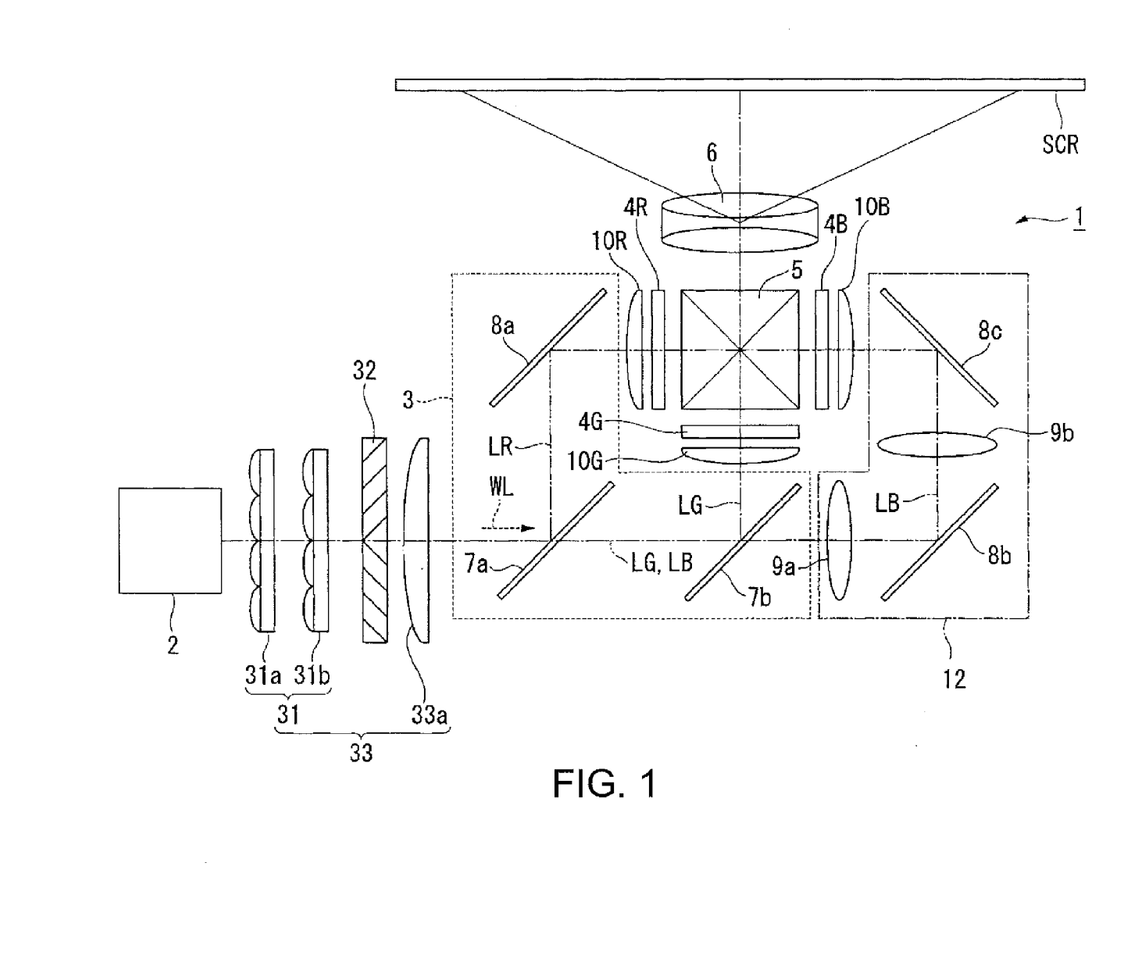
FIG. 1 is a general configuration diagram showing a projector according to a first embodiment of the invention.
Figure 2:
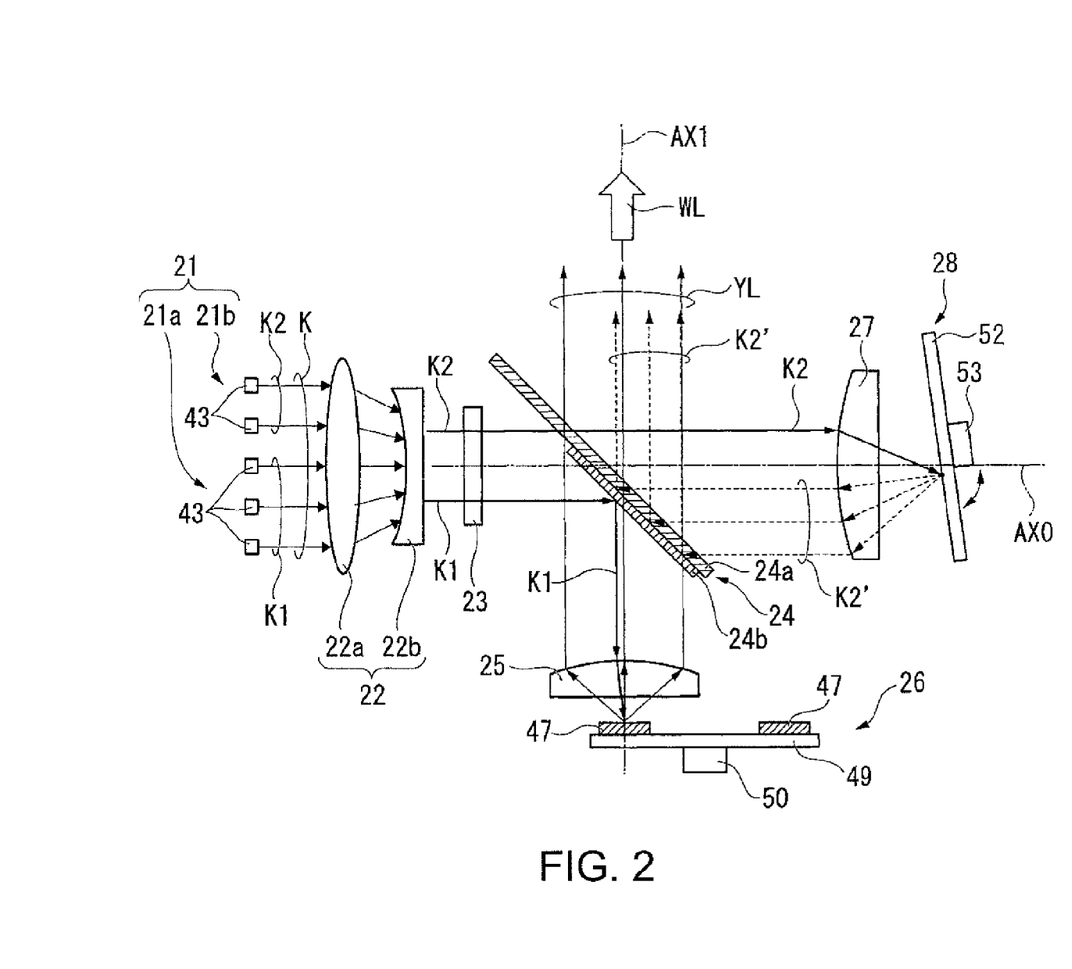
FIG. 2 is a general configuration diagram showing a light source device of the first embodiment.

FIG. 1 is a schematic configuration diagram showing a projector according to the present embodiment. FIG. 2 is a schematic configuration diagram showing a light source device according to the present embodiment.

As shown in FIG. 1, the projector 1 according to the present embodiment is a projection-type image display device for displaying a color image on a screen SCR. The projector 1 is generally provided with the light source device 2, a color separation optical system 3, a relay optical system 12, an integrator optical system 31, a polarization conversion element 32, an overlapping lens 33*a*, a light modulation device 4R for red light, a light modulation device 4G for green light, a light modulation device 4B for blue light, a color combining optical system 5, and a projection optical system 6. The light modulation device 4R for the red light, the light modulation device 4G for the green light, and the light modulation device 4B for the blue light constitute an image forming section.

The light source device 2 emits white illumination light WL toward the overlapping optical system 33.

The integrator optical system 31 is formed of a first multi-lens arrays 31*a* and a second multi-lens array 31*b*. In the embodiment, the integrator optical system 31 forms the overlapping optical system 33 in cooperation with the overlapping lens 33*a*.

The polarization conversion element 32 is formed of a polarization separation film and a retardation plate. The polarization conversion element 32 converts the incident light as unpolarized light into, for example, S-polarized light. Further, the polarization conversion element 32 converts the blue diffusive light having the polarization state in which the disturbance occurs due to the photo-elastic effect by a lens described later into, for example, S-polarized light. The illumination light WL having been transmitted through the polarization conversion element 32 is overlapped in an illumination target area by the overlapping lens 33*a*.

The color separation optical system 3 separates the illumination light WL having been emitted from the light source device 2 into the red light LR, the green light LG, and the blue light LB. The color separation optical system 3 is provided with a first dichroic mirror 7*a*, a second dichroic mirror 7*b*, and a first reflecting mirror 8*a*.

The first dichroic mirror 7*a* separates the illumination light WL having been emitted from the light source device 2 into the red light LR, and the light including the green light LG and the blue light LB. The first dichroic mirror 7a reflects the red light LR, and transmits the green light LG and the blue light LB.

The second dichroic mirror 7b separates the light having been transmitted through the first dichroic mirror 7a into the green light LG and the blue light LB. The second dichroic mirror 7b reflects the green light LG and transmits the blue light LB.

The first reflecting mirror 8a is disposed in the light path of the red light LR. The first reflecting mirror 8a reflects the red light LR, which has been reflected by the first dichroic mirror 7a, toward the light modulation device 4R. The green light LG is reflected by the second dichroic mirror 7b, and the proceeds toward the light modulation device 4G.

The relay optical system 12 is disposed on the light exit side of the second dichroic mirror 7b in the light path of the blue light LB. The relay optical system 12 includes a second reflecting mirror 8b, a third reflecting mirror 8c, a first relay lens 9a, and a second relay lens 9b.

The second reflecting mirror 8b and the third reflecting mirror 8c are disposed in the light path of the blue light LB. The relay optical system 12 guides the blue light LB having been transmitted through the second dichroic mirror 7b to the light modulation device 43.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

In the present embodiment, the light modulation device 4B corresponds to a "first light modulation device" in the appended claims.

As the light modulation devices 4R, 4G, and 4B, there are used, for example, transmissive liquid crystal panels. Further, in the entrance side and the exit side of each of the liquid crystal panels, there are disposed polarization plates not shown, respectively. The polarization plates each transmit linearly polarized light having a specific polarization direction.

On the entrance side of the light modulation device 4R, there is disposed a field lens 10R. On the entrance side of the light modulation device 4G, there is disposed a field lens 10G. On the entrance side of the light modulation device 4B, there is disposed a field lens 10B. The field lens 10R collimates the red light LR entering the light modulation device 4R. The field lens 10G collimates the green light LG entering the light modulation device 4G. The field lens 10B collimates the blue light LB entering the light modulation device 4B.

The color combining optical system 5 combines the image light corresponding to the red light LR, the image light corresponding to the green light LG, and the image light corresponding to the blue light LB with each other, and then emits the image light thus combined toward the projection optical system 6. As the color combining optical system 5, there is used, for example, a cross dichroic prism.

The projection optical system 6 is formed of a projection lens group including a plurality of projection lenses. The projection optical system 6 projects the image light combined by the color combining optical system 5 toward the screen SCR in an enlarged manner. Thus, a color image thus enlarged is displayed on the screen SCR.

The light source device 2 will hereinafter be described.

As shown in FIG. 2, the light source device 2 is provided with a light source unit 21, an afocal optical system 22, a uniform illumination optical system 23, a light separating/combining element 24, a first pickup lens 25, a phosphor wheel 26 having a phosphor layer (a wavelength conversion layer), a second pickup lens 27, and a rotary diffusion element 28.

The light source unit 21, the afocal optical system 22, the uniform illumination optical system 23, the light separating/combining element 24, the second pickup lens 27, and the rotary diffusion element 28 are disposed on an optical axis AX0. The first pickup lens 25 and the phosphor wheel 26 are disposed on an optical axis AX1 perpendicular to the optical axis AX0.

The light source unit 21 includes a first light source section 21a and a second light source section 21b.

The first light source section 21a and the second light source section 21b are each formed of a plurality of semiconductor lasers 43 arranged in an array in a plane perpendicular to the optical axis AX0. The semiconductor lasers 43 each emit, for example, blue light beam with a wavelength of 455 nm.

In the present embodiment, the first light source section 21a emits a first light bundle K1 formed of a plurality of light beams, and the second light source section 21b emits a second light bundle K2 formed of a plurality of light beams.

Based on such a configuration, the light source unit 21 is arranged to emit bundle of light beams K including the first light bundle K1 and the second light bundle K2.

In the present embodiment, the first light source section 21a and the second light source section 21b are arranged so that the second light bundle K2 constitutes at least a part of the outer edge area of the bundle of light beams K. It should be noted that in FIG. 2, principal light beams are only illustrated with respect to the first light bundle K1 and the second light bundle K2 in the subsequent stages of the afocal optical system 22 for making the drawing eye-friendly.

Here, while the luminous efficiency of the fluorescence light in the phosphor wheel 26 is about 50%, the reflectance of the rotary diffusion element 28 approximates 100%.

The light source unit 21 of the present embodiment is configured so that the ratio between the light intensity of the first light bundle K1 and the light intensity of the second light bundle K2 becomes about 4:1. Thus, the proportions of the component of the diffusely reflected light (the blue light) described later generated by the rotary diffusion element 28, the component of the green light constituting the yellow fluorescence light described later, and the component of the red light constituting the fluorescence light are made to roughly coincide with each other.

Therefore, it is possible for the light source device 2 to generate the white illumination light with fair hue by combining the fluorescence light and the diffusely reflected light with each other.

The first light bundle K1 and the second light bundle K2 having been emitted from the light source unit 21 are collimated by a collimator optical system not shown, and then enter the afocal optical system 22.

The afocal optical system 22 adjusts the size (a spot diameter) of the bundle of light beams K including the first light bundle K1 and the second light bundle K2. The afocal optical system 22 is formed of, for example, two afocal lenses 22a, 22b. The bundle of light beams adjusted in spot diameter by being transmitted through the afocal optical system 22 enters the uniform illumination optical system 23.

The uniform illumination optical system 23 forms a uniform illumination spot with respect to the phosphor wheel and the rotary diffusion element 28. The uniform illumination optical system 23 is formed of, for example, a pair of multi-lens arrays.

The light separating/combining element 24 is provided with a glass substrate 24a, and a dielectric multilayer film 24b disposed on one surface side of the glass substrate 24a. The light separating/combining element 24 is disposed so as to form an angle of 45° with respect to each of the optical axis AX0 and the optical axis AX1.

In the present embodiment, the dielectric multilayer film 24b is configured so as to reflect, for example, the blue light having the wavelength equal to or shorter than 460 nm regardless of the polarization state, and transmit the yellow light having the wavelength equal to or longer than 500 nm regardless of the polarization state. Specifically, the dielectric multilayer film 24b has a wavelength separation property of reflecting the first light bundle K1 formed of the blue light, and the diffusely reflected light K2' generated by the second light bundle K2 reflected by the rotary diffusion element 28, and transmitting the fluorescence light formed of the yellow light. The dielectric multilayer film 24b corresponds to a "dichroic layer" of the appended claims.

The dielectric multilayer film 24b is formed in a partial area on the one surface of the glass substrate 24a. Specifically, the dielectric multilayer film 24b is disposed so as to correspond to the incident position of the first light bundle K1 on the glass substrate 24a, and is not disposed at the position corresponding to the incident position of the second light bundle K2. The second light bundle K2 is transmitted through the glass substrate 24a without entering the dielectric multilayer film 24b. It should be noted that in the light separating/combining element 24, it is also possible to arrange that the glass substrate 24a is not disposed on the light path of the second light bundle K2. According to this configuration, the size of the glass substrate 24a can be decreased, and furthermore, the light separating/combining element 24 can be miniaturized.

Based on such a configuration, the light separating/combining element 24 reflects the first light bundle K1 while transmitting the second light bundle K2 to thereby separate the bundle of light beams K having been emitted from the light source unit 21.

The first light bundle K1 having been reflected by the light separating/combining element 24 proceeds toward the phosphor wheel 26. The second light bundle K2 having been transmitted through the light separating/combining element 24 proceeds toward the rotary diffusion element 28.

The first light bundle K1 enters the first pickup lens 25. The first pickup lens 25 converges the first light bundle K1 toward the phosphor layer 47 on the phosphor wheel 26.

The first light bundle K1 having been transmitted through the first pickup lens 25 enters the phosphor wheel 26. The phosphor wheel 26 is a reflective rotary phosphor plate, and has the phosphor layer 47 for emitting the fluorescence light (a third light bundle), a rotary plate 49 for supporting the phosphor layer 47, a reflecting film (not shown) disposed between the phosphor layer 47 and the rotary plate 49, and a drive motor 50 for driving the rotary plate 49.

The phosphor layer 47 includes phosphor particles. The phosphor particles are excited by the first light bundle K1 (excitation light) to emit the yellow fluorescence light YL. As the phosphor particles, there can be used, for example, yttrium aluminum garnet (YAG) based phosphor.

The fluorescence light YL having been emitted from the phosphor layer 47 is transmitted through the first pickup lens 25 and then enters the light separating/combining element 24. The fluorescence light YL is transmitted through the dielectric multilayer film 24b and the glass substrate 24a.

Meanwhile, the second light bundle K2 enters the second pickup lens 27. The second pickup lens 27 converges the second light bundle K2 toward the rotary diffusion element 28.

The rotary diffusion element 28 is provided with a diffusely reflecting plate 52 and a drive motor 53 for rotating the diffusely reflecting plate 52. The diffusely reflecting plate 52 diffusely reflecting the second light bundle K2 having been emitted from the second pickup lens 27 to thereby generate the diffusely reflected light K2'. The diffusely reflected light K2' proceeds toward the light separating/combining element 24. It is preferable for the diffusely reflecting plate 52 to diffusely reflect the second light bundle K2 to the extent that it is possible to make as much component of the diffusely reflected light K2' as possible enter the dielectric multilayer film 24b. The diffusely reflecting plate 52 is a member obtained by etching the glass surface with hydrofluoric acid to form a continuum of fine spherical surfaces, and has a diffusion angle which can be controlled to an arbitrary value using the curvature of the spherical surface and the area of the surface.

The second light bundle K2 is transmitted through the non-forming area of the dielectric multilayer film 24b in the light separating/combining element 24 to thereby enter the second pickup lens 27.

Here, in the case in which the path of the diffusely reflected light K2' having been emitted from the rotary diffusion element 28 coincides with the incident path of the second light bundle K2 to the rotary diffusion element 28, it is not achievable to reflect the diffusely reflected light K2' by the dielectric multilayer film 24b.

In the present embodiment, the optical axis of the second pickup lens 27 coincides with the optical axis AX0. Further, since the second light bundle K2 constitutes at least a part of the outer edge area of the bundle of light beams K, it is possible to easily make the second light bundle K2 enter the area located off the optical axis AX0 in the second pickup lens 27. Therefore, even if the normal line of the reflecting surface of the diffusely reflecting plate 52 is parallel to the optical axis AX0, the path of the diffusely reflected light K2' is different from the incident path of the second light bundle K2 to the rotary diffusion element 28. Further, as shown in FIG. 2, since the normal line of the reflecting surface of the diffusely reflecting plate 52 is tilted with respect to the optical axis AX0, the path of the diffusely reflected light K2' (the reflecting direction of the second light bundle K2) is completely different from the incident direction.

In the present embodiment, the diffusely reflecting plate 52 is disposed so that the principal ray of the diffusely reflected light K2' proceeds in the plane including the optical axis AX0 and the optical axis AX1, and then enters the dielectric multilayer film 24b. Specifically, since the point where the second light bundle K2 enters in the diffusely reflecting plate 52 is disposed at the focal position of the second pickup lens 27, the diffusely reflected light K2' having been transmitted through the second pickup lens 27 proceeds toward the light separating/combining element 24 along the light path parallel to the second light bundle K2 and different from the second light bundle K2. Thus, the diffusely reflected light K2' enters the dielectric multilayer film 24b.

It should be noted that if the light paths of the second light bundle K2 and the diffusely reflected light K2' can be separated from each other, the normal line of the reflecting surface of the diffusely reflecting plate 52 can be parallel to the optical axis AX0.

Thus, the diffusely reflected light K2' is reflected by the dielectric multilayer film 24b to thereby be combined with the fluorescence light YL having been transmitted through the dielectric multilayer film 24b. Thus, the white illumination light WL is emitted from the light source device 2.

It should be noted that it is also possible that the second pickup lens 27 expands due to the heat caused by the laser beam to cause disturbance in the polarization due to the photo-elastic effect.

However, in the light source device 2 according to the present embodiment, the bundle of light beams K is separated into the first light bundle K1 and the second light bundle K2 using the light separating/combining element 24 not using the polarization separation function. In other words, since the bundle of light beams K is separated without using a polarizer, there is no need to use the light separating/combining element (the polarizer) having the polarization separation function when combining the diffusely reflected light K2' and the fluorescence light YL with each other. Therefore, when combining the diffusely reflected light K2' and the fluorescence light YL with each other, there is no chance to be affected by the change in polarization plane due to the photo-elastic effect.

The illumination light WL having been emitted from the light source device 2 enters the integrator optical system 31 shown in FIG. 1.

The illumination light WL is divided by the integrator optical system 31 and then enters the overlapping lens 33a in the state of being converted by the polarization conversion element 32 into, for example, S-polarized light. The illumination light WL having passed through the overlapping lens 33a is separated by the color separation optical system 3 into the red light LR, the green light LG, and the blue light LB, and the colored light roughly uniformly illuminates the respective light modulation devices 4R, 4G, and 4B.

Figure 3:
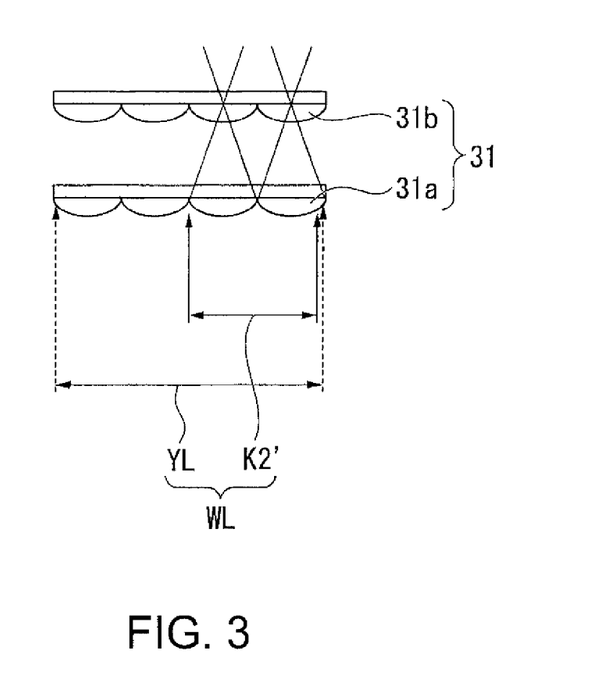
FIG. 3 is a configuration diagram showing a state of incidence of illumination light to an integrator optical system.

FIG. 3 is a diagram showing a state of incidence of the illumination light WL to the integrator optical system 31.

As shown in FIG. 3, the fluorescence light YL passes through entire areas of the first multi-lens array 31a and the second multi-lens array 31b. Therefore, the principal ray of the red light LR perpendicularly enters the center of the image forming area of the light modulation device 4R, and the principal ray of the green light LG perpendicularly enters the center of the image forming area of the light modulation device 4G. Therefore, the light modulation device 4R and the light modulation device 4G are uniformly illuminated with the red light LR and the green light LG, respectively.

In contrast, since the principal ray of the diffusely reflected light K2' having been emitted from the light source device 2 is shifted from the principal ray of the fluorescence light YL, the diffusely reflected light K2' passes through a part of each of the first multi-lens array 31a and the second multi-lens array 31b. It should be noted that the diffusely reflected light K2' corresponds to the blue light LB.

Figure 4:
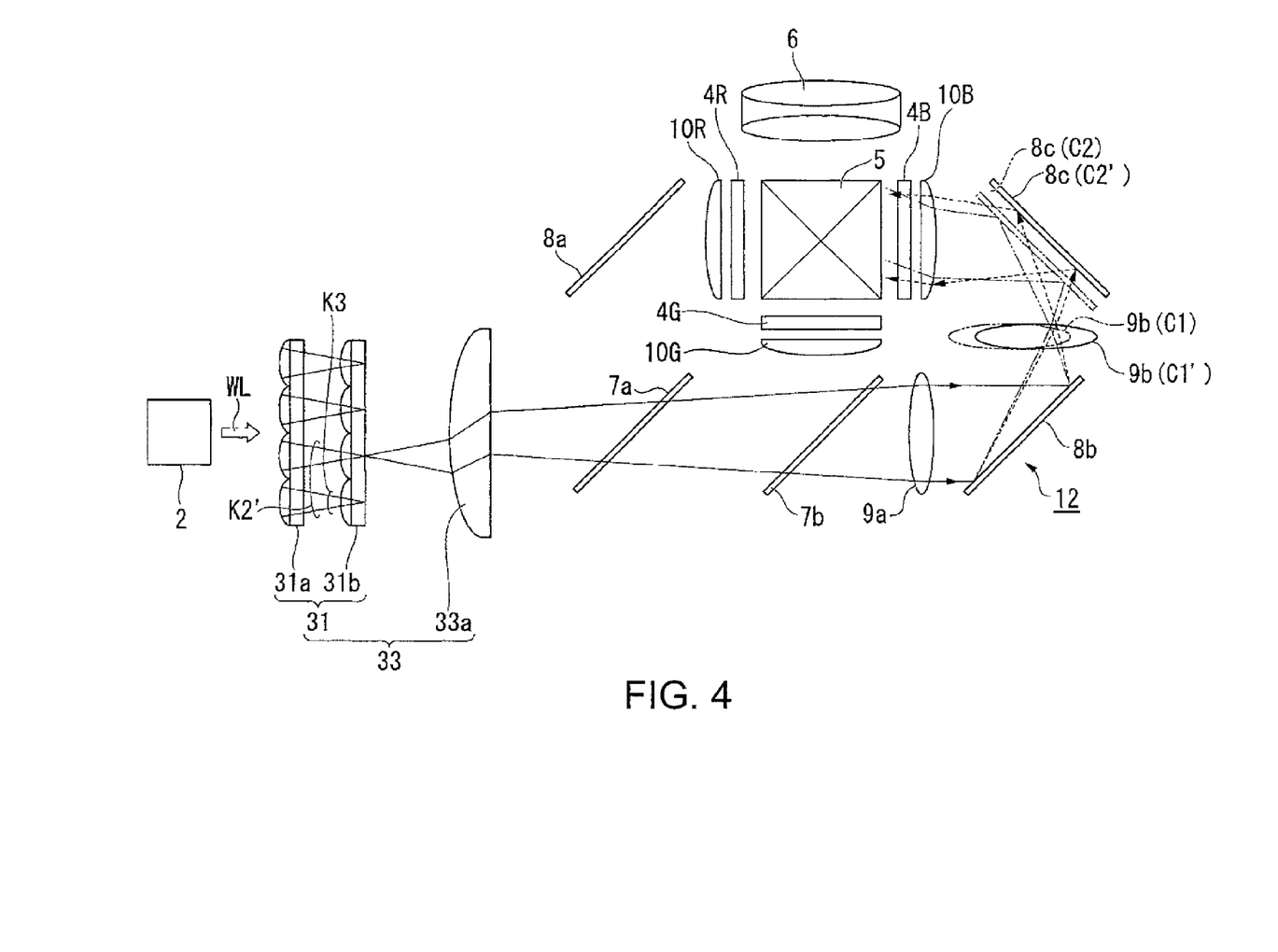
FIG. 4 is a diagram showing a configuration of a relay optical system of the first embodiment.

FIG. 4 is a diagram showing a configuration of the relay optical system 12 of the present embodiment. In FIG. 4, in order to make the drawing eye-friendly, there is illustrated one of a plurality of small bundles of light beams K3, which has been generated by the first multi-lens array 31a dividing the diffusely reflected light K2'. Further, the polarization conversion element 32 is omitted.

In the relay optical system 12, the small light bundle K3 is reflected by the second reflecting mirror 8b through the first relay lens 9a to thereby enter the second relay lens 9b. The small light bundle K3 having been emitted from the second relay lens 9b is reflected by the third reflecting mirror 8c, and then enters the field lens 10B. The small light bundle K3 having been converted by the field lens 10B into parallel light is overlapped on the light modulation device 4B.

In the present embodiment, the second reflecting mirror 8b corresponds to a "first reflecting element" of the appended claims, the third reflecting mirror 8c corresponds to a "second reflecting element" of the appended claims, and the second relay lens 9b corresponds to a "relay lens" of the appended claims.

In the present embodiment, illumination unevenness of the light modulation device 4B caused by a shift between the principal ray of the diffusely reflected light K2' and the principal ray of the fluorescence light YL is resolved by correcting the position of the second relay lens 9b and the position of the third reflecting mirror 8c. The principal ray of the diffusely reflected light K2' is hereinafter referred to as a light axis of the diffusely reflected light K2' in some cases. Further, the principal ray of the fluorescence light YL is referred to as a light axis of the fluorescence light YL in some cases.

For example, if the positional correction described above is not performed, the principal ray of the diffusely reflected light K2' having entered the second relay lens 9b fails to be emitted perpendicularly from the second relay lens 9b, and enters the light modulation device 4B with a predetermined angle. Then, the luminance unevenness occurs in the blue image light.

The positional correction of the second relay lens 9b and the third reflecting mirror 8c in the present embodiment will hereinafter be described. In FIG. 4, the positions of the second relay lens 9b and the third reflecting mirror 8c on which the positional correction described above has not yet performed are respectively referred to as pre-correction positions C1, C2. In other words, the pre-correction positions C1, C2 correspond respectively to the positions of the second relay lens 9b and the third reflecting mirror 8c at which the blue light LB can substantially perpendicularly enter the light modulation device 4B in the case in which the light axis of the diffusely reflected light K2' and the light axis of the fluorescence light YL coincide with each other.

In FIG. 4, it is assumed that the relay optical system 12 is viewed from a direction perpendicular to a plane (the sheet of FIG. 4) including the center axis of the diffusely reflected light K2' entering the second reflecting mirror 8b and the center axis of the diffusely reflected light K2' having been reflected by the second reflecting mirror 8b. Further, it is assumed that the light axis of the diffusely reflected light K2' is shifted from the light axis of the fluorescence light YL in that plane.

Although not shown in the drawings, if it is assumed that the principal ray of the diffusely reflected light K2' has coincide with the principal ray of the fluorescence light YL, the principal ray of the diffusely reflected light K2' having been reflected by the second reflecting mirror 8b coincides with the optical axis of the second relay lens 9b located at the pre-correction position C1.

The second relay lens 9b of the present embodiment is located at a corrected position C1' at which the light axis is separated from the optical axis of the second relay lens 9b located at the pre-correction position C1.

Specifically, in the present embodiment, the second relay lens 9b is disposed so that the principal ray of the diffusely reflected light K2' having been emitted from the second relay lens 9b becomes perpendicular to the second relay lens 9b. Due to such a positional correction of the second relay lens 9b as described above, it becomes possible to make the diffusely reflected light K2' roughly perpendicularly enter the light modulation device 4B. Thus, since the difference between the central angle of the incident angle distribution of the diffusely reflected light K2' in the light modulation device 4B and the central angle of the incident angle distribution of the colored light in other light modulation devices is decreased, the color variation can be reduced.

However, since there is a possibility that the illumination area by the diffusely reflected light K2' is shifted from the light modulation device 4B only with the positional correction of the second relay lens 9b, it is necessary to provide a margin to the illumination area.

Therefore, in the present embodiment, the third reflecting mirror 8c is disposed at a corrected position C2' translated from the pre-correction position C2 so that the principal ray of the diffusely reflected light K2' coincides with the optical axis of the field lens 10B.

In the present embodiment, the field lens 10B corresponds to a "field lens" in the appended claims.

According to the present embodiment, the diffusely reflected light K2' (the blue light LB) roughly perpendicularly enters the light modulation device 4B, and at the same time, the center of the illumination area by the diffusely reflected light K2' coincides with the center of the image forming area provided to the light modulation device 4B.

Therefore, the blue image light having been generated by the light modulation device 4B becomes to have a uniform contrast similarly to the red image light or the green image light.

Thus, it is possible to make the red image light, the green image light, and the blue image light roughly equal in luminance to each other. Here, the state in which the red image light, the green image light, and the blue image light are roughly equal in luminance to each other includes the case in which there occurs a difference which can be corrected by an adjustment of drive signals (e.g., drive voltages) of the light modulation devices 4R, 4G, and 4B.

Therefore, according to the projector 1 related to the present embodiment, in the case of combining the image light of the light modulation devices 4R, 4G, and 4B with each other, the image light having the color unevenness decreased can be generated.

Second Embodiment

Subsequently, a light source device according to a second embodiment of the invention will be described. The difference between the present embodiment and the first embodiment is the configuration of the relay optical system, and the rest of the configuration is common. Therefore, in the following description, regarding the constituents and the members common to the first embodiment and the present embodiment, the common reference symbols are used, and the detailed description will be omitted.

Figure 5:
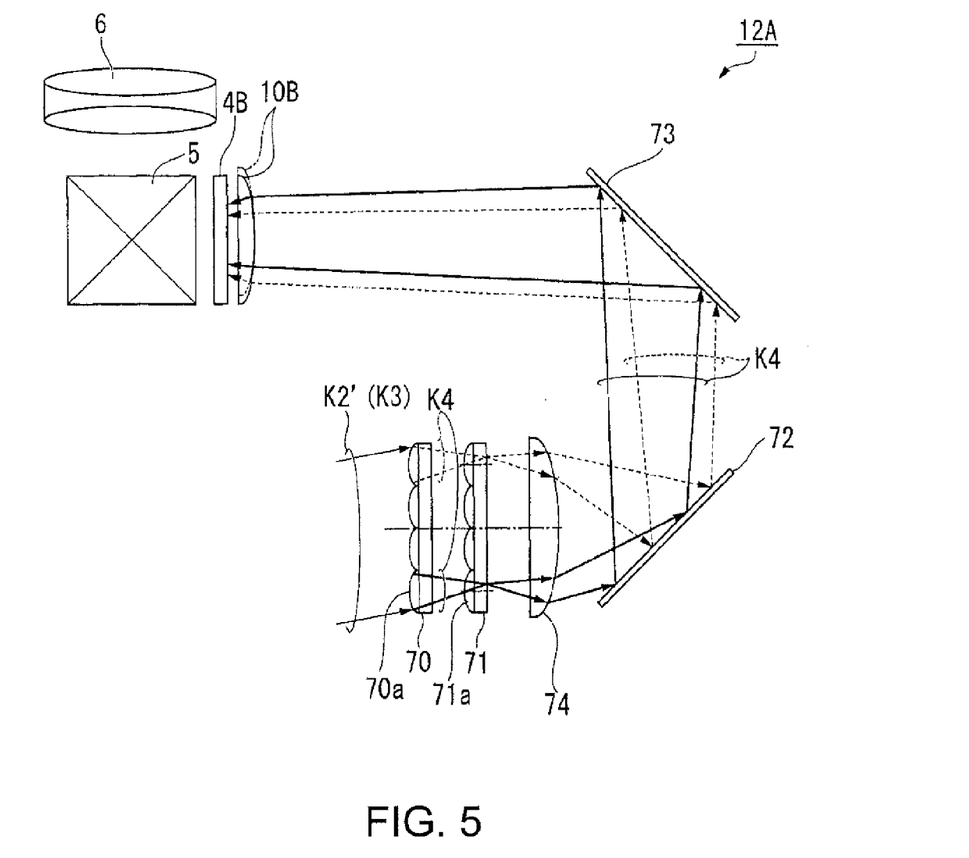
FIG. 5 is a diagram showing a relay optical system of a light source device according to a second embodiment of the invention.

FIG. 5 is a diagram showing the relay optical system of the light source device according to the present embodiment. As shown in FIG. 5, the relay optical system 12A of the present embodiment has a third lens array 70, a fourth lens array 71, a first reflecting mirror 72, a second reflecting mirror 73, and an overlapping lens 74.

It should be noted that in the present embodiment, the first reflecting mirror 72 corresponds to a "third reflecting element" of the appended claims, and the second reflecting mirror 73 corresponds to a "fourth reflecting element" of the appended claims.

The third lens array 70 has a plurality of lenses 70a each having a similar shape to a pixel area of the light modulation device 43, and further divides the diffusely reflected light K2' (the small light bundle K3) from the overlapping optical system 33 (see FIG. 3) using the plurality of lenses 70a. The fourth lens array 71 has a plurality of lenses 71a corresponding respectively to the lenses 70a of the third lens array 70. The fourth lens array 71 overlaps the images of the respective lenses 70a with each other on the light modulation device 4B via the field lens 10B in cooperation with the overlapping lens 74. It should be noted that in the present embodiment, the field lens 103 corresponds to a "second field lens" in the appended claims.

As described above, the principal ray of the fluorescence light YL and the principal ray of the diffusely reflected light K2' are shifted from each other (see, FIG. 3). Therefore, the principal ray of the diffusely reflected light K2' input from the overlapping optical system 33 obliquely enters the third lens array 70.

The tilt of the principal ray of the diffusely reflected light K2' incurs deviation of the secondary light source image formed in each of the lenses 71a. The diffusely reflected light K2' (a small light bundle K4 generated by dividing the small light bundle K3) emitted from each of the lenses 71a and overlapped on the light modulation device 4B obliquely enters the light modulation device 4D. However, since the incident angle of the principal ray of the diffusely reflected light K2' to the light modulation device 4B is not very large, by adjusting the arrangement position of the field lens 10B, it is possible to make the diffusely reflected light K2' enter the light modulation device 4B so that the principal ray of the diffusely reflected light K2' is roughly perpendicular to the light modulation device 4B.

Specifically, the arrangement position of the field lens 103 is adjusted as follows. As indicated by the solid line in FIG. 5, in general, the field lens 10B is disposed so that the optical axis of the field lens 10B passes through the center of the light modulation device 43. By shifting the field lens 103 as much as an appropriate amount in parallel to a plane parallel to the optical axis of the field lens 103 and the normal line of the reflecting surface of the second reflecting mirror 73 and in parallel to the surface of the light modulation device 4B as indicated by the dotted line using the arrangement as a reference, it is possible to make the diffusely reflected light K2' enter the light modulation device 4B so that the principal ray of the diffusely reflected light K2' is roughly perpendicular to the light modulation device 43. The direction in which the field lens 103 is shifted is determined in accordance with how the principal ray of the fluorescence light YL as shown in FIG. 3 and the principal ray of the diffusely reflected light K2' are shifted from each other. According to the fact described above, the principal ray of the diffusely reflected light K2' having passed through the field lens 10B coincides with the center of the image forming area provided to the light modulation device 4B.

According to the present embodiment, the blue light LB (the diffusely reflected light K2') roughly perpendicularly enters the light modulation device 4B, and at the same time, the center of the illumination area by the blue light BL coincides with the center of the light modulation device 4B.

It should be noted that the method of adjusting the influence of the tilt of the diffusely reflected light K2' is not limited to the method described above, but the influence can also be adjusted by, for example, correcting the drive signals of the light modulation devices 4R, 4G, and 4B. The image with the color variation reduced can also be generated using the method described above.

Third Embodiment

Subsequently, a light source device according to a third embodiment of the invention will be described. The difference between the present embodiment and the embodiments described above is the configuration of the light source device, and the rest of the configuration is common. Therefore, in the following description, regarding the constituents and the members common to the embodiments described above and the present embodiment, the common reference symbols are used, and the detailed description will be omitted.

Figure 6:
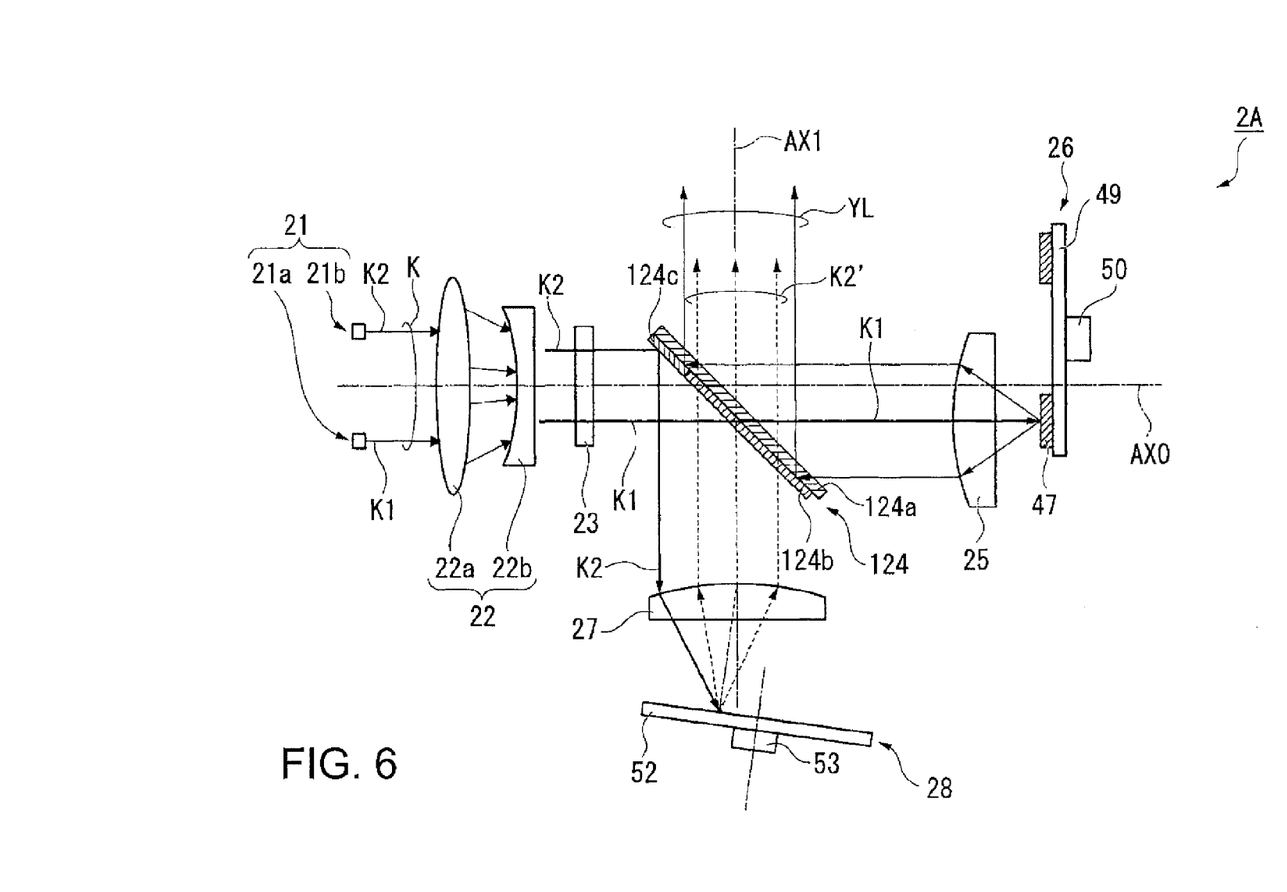
FIG. 6 is a diagram showing a configuration of a light source device according to a third embodiment of the invention.

FIG. 6 is a diagram showing a configuration of a light source device 2A according to the present embodiment.

As shown in FIG. 6, the light source device 2A according to the present embodiment is provided with the light source unit 21, the afocal optical system 22, the uniform illumination optical system 23, a light separating/combining element 124, the first pickup lens 25, the phosphor wheel 26 having a phosphor layer, the second pickup lens 27, and the rotary diffusion element 28.

In the present embodiment, the light source unit 21, the afocal optical system 22, the uniform illumination optical system 23, the light separating/combining element 124, the first pickup lens 25, and the phosphor wheel 26 are disposed on the optical axis AX0. The light separating/combining element 124, the second pickup lens 27, and the rotary diffusion element 28 are disposed on the optical axis AX1. The light separating/combining element 124 is disposed so as to form an angle of 45° with respect to each of the optical axis AX0 and the optical axis AX1. Also in the present embodiment, it is not required for the normal line of the reflecting surface of the diffusely reflecting plate 52 to be tilted with respect to the optical axis AX1.

The light separating/combining element 124 of the present embodiment is provided with a glass substrate 124a, a dielectric multilayer film 124b, and a reflecting section 124c. The dielectric multilayer film 124b and the reflecting section 124c are disposed on one surface side of the glass substrate 124a.

In the present embodiment, the dielectric multilayer film 124b is configured so as to transmit, for example, the blue light having the wavelength equal to or shorter than 460 nm regardless of the polarization direction, and reflect the yellow light having the wavelength equal to or longer than 500 nm regardless of the polarization direction. In other words, the dielectric multilayer film 124b has wavelength separation characteristics of transmitting the diffusely reflected light K2' having blue color, and reflecting the fluorescence light YL having yellow color. The center wavelength of the diffusely reflected light K2' is different from the center wavelength of the fluorescence light YL.

In the present embodiment, the reflecting section 124c is formed of, for example, a mirror, and is formed in a partial area on one surface of the glass substrate 124a. Specifically, the reflecting section 124c is disposed in an incident region of the second light bundle K2 as a part of the light emitted from the light source unit 21 to the light separating/combining element 124. The dielectric multilayer film 124b is disposed in an incident region of the first light bundle K1 to the light separating/combining element 124. In the present embodiment, the incident region of the first light bundle K1 corresponds to a "first region" of the appended claims, and the second light bundle K2 corresponds to a "second region" of the appended claims.

Based on such a configuration, the light separating/combining element 124 of the present embodiment transmits the first light bundle K1 while reflecting the second light bundle K2 to thereby separate the light having been emitted from the light source unit 21.

The first light bundle K1 having been transmitted through the light separating/combining element 124 proceeds toward the phosphor wheel 26, and the second light bundle K2 having been reflected by the light separating/combining element 124 proceeds toward the rotary diffusion element 28.

Similarly to the first embodiment, also in the light source device 2A according to the present embodiment, the light having been emitted from the light source unit 21 is separated into the first light bundle K1 and the second light bundle K2 without using a polarizer. Therefore, when combining the diffusely reflected light K2' and the fluorescence light YL with each other, there is no chance to be affected by the photo-elastic effect.

Fourth Embodiment

Subsequently, a light source device according to a fourth embodiment of the invention will be described. The difference between the present embodiment and the first embodiment is the configuration of the light separating/combining element in the light source device 2, and the rest of the configuration is common. Therefore, in the following description, regarding the constituents and the members common to the embodiments described above and the present embodiment, the common reference symbols are used, and the detailed description will be omitted.

Figure 7:
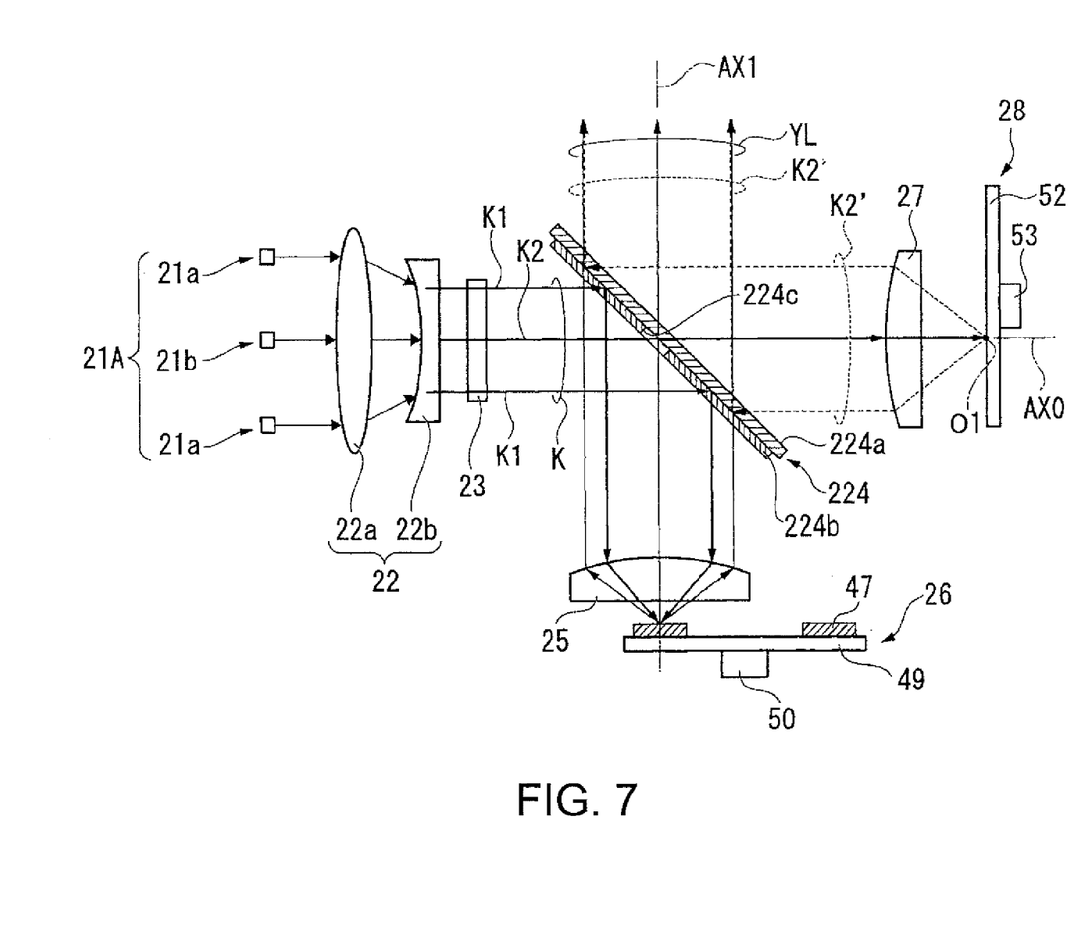
FIG. 7 is a diagram showing a light separating/combining element and a light source unit according to a fourth embodiment of the invention.

FIG. 7 is a diagram showing a light separating/combining element and a light source unit according to the present embodiment.

As shown in FIG. 7, in the light source unit 21A of the present embodiment, the first light source section 21a and the second light source section 21b are laid out so that the second light bundle K2 constitutes a central area of the bundle of light beams K.

Further, a light separating/combining element 224 of the present embodiment is provided with a glass substrate 244a, and a dielectric multilayer film 224b disposed on one surface side of the glass substrate 224a. In the present embodiment, in the central area of the dielectric multilayer film 224b, there is formed an opening section 224c. The dielectric multilayer film 224b is disposed so as to correspond to the incident position of the bundle of light beams K having been emitted from the light source unit 21A to the light separating/combining element 224, and the opening section 224c is formed at the position corresponding to the incident position of the second light bundle K2 to the light separating/combining element 224.

Thus, the second light bundle K2 enters the opening section 224c without entering the dielectric multilayer film 224b, and is then transmitted through the glass substrate 224a.

It should be noted that although in FIG. 7, the rotary diffusion element 28 is disposed so that the normal line of the reflecting surface of the diffusely reflecting plate 52 dose not tilt with respect to the optical axis AX0, it is possible to dispose the rotary diffusion element 28 so that the normal line tilts with respect to the optical axis AX0.

According to the light separating/combining element 224 of the present embodiment, by using the dielectric multilayer film 224b provided with the opening section 224c, it is possible to easily separate the light having been emitted from the light source unit 21A into the first light bundle K1 and the second bundle of light beam K2 without using a polarizer.

Fifth Embodiment

Subsequently, a light source device according to a fifth embodiment of the invention will be described. The present embodiment is obtained by combining the third embodiment and the fourth embodiment described above with each other. Therefore, in the following description, regarding the constituents and the members common to the embodiments described above and the present embodiment, the common reference symbols are used, and the detailed description will be omitted.

Figure 8:
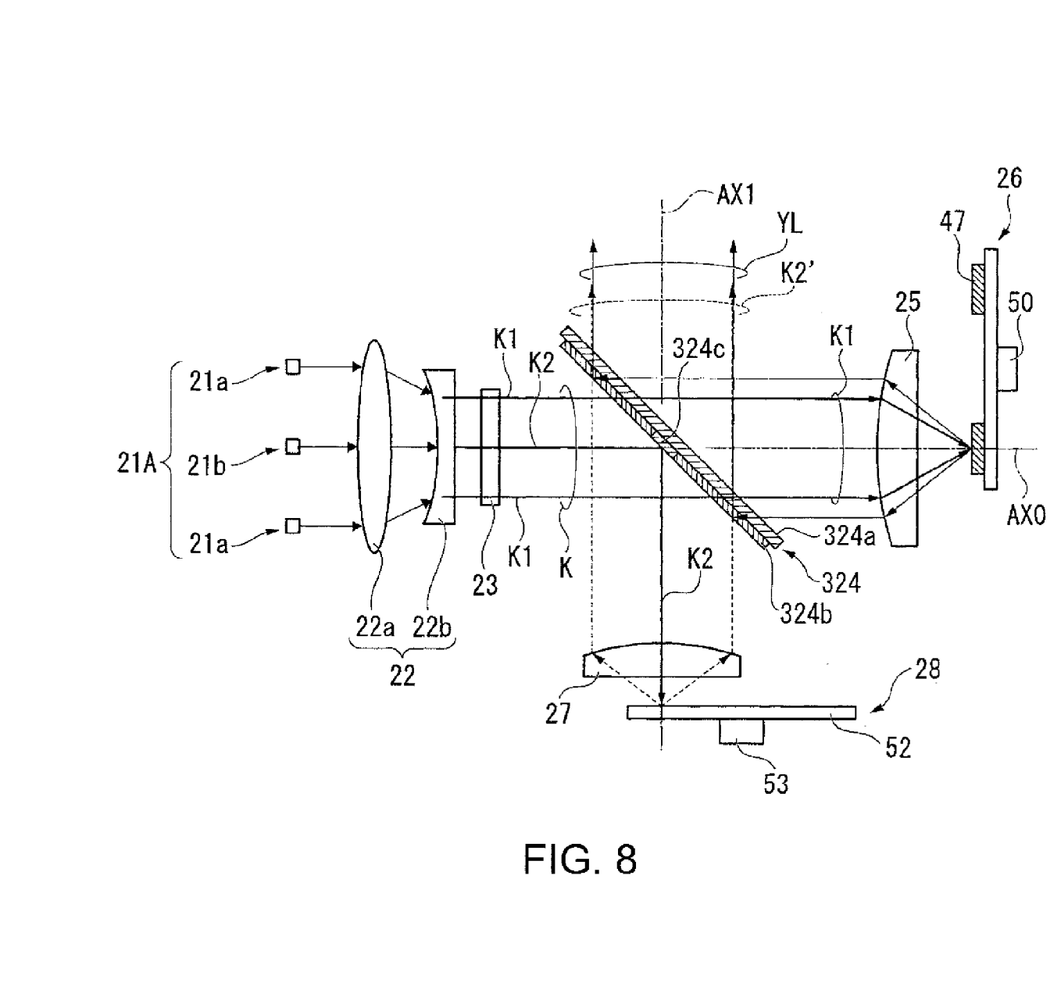
FIG. 8 is a diagram showing a light separating/combining element and a light source unit according to a fifth embodiment of the invention.

FIG. 8 is a diagram showing a light separating/combining element and a light source unit according to the present embodiment.

As shown in FIG. 8, a light separating/combining element 324 of the present embodiment is provided with a glass substrate 324a, a dielectric multilayer film 324b, and a reflecting section 324c. The dielectric multilayer film 324b and the reflecting section 324c are disposed on one surface side of the glass substrate 324a.

In the light source unit 21A of the present embodiment, the first light source section 21a and the second light source section 21b are laid out so that the second light bundle K2 constitutes a central area of the bundle of light beams K.

The dielectric multilayer film 324b is disposed in an incident region of the first light bundle K1 to the light separating/combining element 324. The reflecting section 324c is disposed in an incident region of the second light bundle K2 to the light separating/combining element 324. The reflecting section 324c is disposed in a central area of the dielectric multilayer film 324b. The reflecting section 324c can also be stacked on the dielectric multilayer film 324b, or can also be disposed inside an opening provided to the dielectric multilayer film 324b.

Based on such a configuration, the light separating/combining element 324 of the present embodiment transmits the first light bundle K1 while reflecting the second light bundle K2 to thereby separate the light having been emitted from the light source unit 21.

Also in the present embodiment, the light having been emitted from the light source unit 21A can be separated into the first light bundle K1 and the second light bundle K2 without using a polarizer.

It should be noted that the invention is not necessarily limited to the configurations of the embodiments described above, but a variety of modifications can be added to the configurations within the scope or the spirit of the invention.

For example, although in the embodiments described above, there is cited the case in which the phosphor layer 47 is disposed on the rotary plate 49 as an example, the phosphor layer 47 can also be disposed on a substrate which does not rotate. Further, a diffusion element which does not rotate can also be used instead of the rotary diffusion element 42.

Further, although in the embodiments described above, there is illustrated the projector 1 provided with the three light modulation devices 4R, 4G, and 4B, the invention can also be applied to a projector for displaying a color picture using a single light modulation device.

Besides the above, the shape, the number, the arrangement, the material, and so on of the variety of constituents of the light source device and the projector are not limited to those of the embodiments described above, but can arbitrarily be modified.

Further, although in the embodiments described above, there is described the example of mounting the light source device according to the invention in the projector, the invention is not limited to the example. The light source device according to the invention can also be applied to lighting equipment, a headlight of a vehicle, and so on.

The entire disclosure of Japanese Patent Application No. 2015-122788, filed on Jun. 18, 2015 is expressly incorporated by reference herein.

What is claimed is:

1. A light source device comprising:
   a light source;
   a light separating/combining element including a face with a dichroic layer disposed on a dichroic portion of the face, which is less than an entire surface of the face, and a remaining portion of the face is a non-dichroic portion of the face, the dichroic portion and non-dichroic portion of the face simultaneously receive a bundle of light beams emitted from the light source;
   a wavelength conversion layer;
   a first pickup lens disposed between the light separating/combining element and the wavelength conversion layer;
   a diffusely reflecting element; and
   a second pickup lens disposed between the light separating/combining element and the diffusely reflecting element,
   wherein a bundle of light beams emitted from the light source includes a first light bundle and a second light bundle,
   the first light bundle enters the wavelength conversion layer via the dichroic layer to be converted into a third light bundle,
   the second light bundle enters the diffusely reflecting element, without entering the dichroic layer, to be converted into diffusely reflected light,
   a wavelength of the third light bundle is different from a wavelength of the diffusely reflected light, and
   the dichroic layer combines the third light bundle from the wavelength conversion layer and the diffusely reflected light from the diffusely reflecting element with each other.

2. The light source device according to claim 1, wherein the second light bundle is reflected by the non-dichroic portion of the face, and enters the diffusely reflecting element.

3. The light source device according to claim 1, wherein the second light bundle constitutes at least a part of an outer edge area of the bundle of light beams.

4. A projector comprising:
   the light source device according to claim 1;
   an image forming section provided with a plurality of light modulation devices, and adapted to modulate illumination light emitted from the light source device in accordance with image information to form image light;
   an overlapping optical system disposed in a light path between the light source device and the image forming section, and adapted to overlap the illumination light on each of the light modulation devices;
   a color separation optical system disposed between the overlapping optical system and the image forming section, and adapted to separate the diffusely reflected light from the illumination light having passed through the overlapping optical system;
   a relay optical system adapted to guide the diffusely reflected light having been separated by the color separation optical system to a first light modulation device out of the plurality of light modulation devices; and a projection optical system adapted to project the image light, wherein the relay optical system includes a first reflecting element, a relay lens disposed in a subsequent stage of the first reflecting element, and a second reflecting element disposed in a subsequent stage of the relay lens, and a center axis of the diffusely reflected light entering the first reflecting element is a first center axis, and a center axis of the diffusely reflected light reflected by the first reflecting element is a second center axis, and viewed from a direction perpendicular to a plane including the first center axis and the second center axis, an optical axis of the relay lens is disposed at a position separated from the second center axis such that a principal ray of the diffusely reflected light coincides with a principal ray of the third light bundle.

5. A projector comprising:

the light source device according to claim 2;

an image forming section provided with a plurality of light modulation devices, and adapted to modulate illumination light emitted from the light source device in accordance with image information to form image light;

an overlapping optical system disposed in a light path between the light source device and the image forming section, and adapted to overlap the illumination light on each of the light modulation devices;

a color separation optical system disposed between the overlapping optical system and the image forming section, and adapted to separate the diffusely reflected light from the illumination light having passed through the overlapping optical system;

a relay optical system adapted to guide the diffusely reflected light having been separated by the color separation optical system to a first light modulation device out of the plurality of light modulation devices; and a projection optical system adapted to project the image light, wherein the relay optical system includes a first reflecting element, a relay lens disposed in a subsequent stage of the first reflecting element, and a second reflecting element disposed in a subsequent stage of the relay lens, and a center axis of the diffusely reflected light entering the first reflecting element is a first center axis, and a center axis of the diffusely reflected light reflected by the first reflecting element is a second center axis, and viewed from a direction perpendicular to a plane including the first center axis and the second center axis, an optical axis of the relay lens is disposed at a position separated from the second center axis such that a principal ray of the diffusely reflected light coincides with a principal ray of the third light bundle.

6. A projector comprising:

the light source device according to claim 3;

an image forming section provided with a plurality of light modulation devices, and adapted to modulate illumination light emitted from the light source device in accordance with image information to form image light;

an overlapping optical system disposed in a light path between the light source device and the image forming section, and adapted to overlap the illumination light on each of the light modulation devices;

a color separation optical system disposed between the overlapping optical system and the image forming section, and adapted to separate the diffusely reflected light from the illumination light having passed through the overlapping optical system;

a relay optical system adapted to guide the diffusely reflected light having been separated by the color separation optical system to a first light modulation device out of the plurality of light modulation devices; and a projection optical system adapted to project the image light, wherein the relay optical system includes a first reflecting element, a relay lens disposed in a subsequent stage of the first reflecting element, and a second reflecting element disposed in a subsequent stage of the relay lens, and a center axis of the diffusely reflected light entering the first reflecting element is a first center axis, and a center axis of the diffusely reflected light reflected by the first reflecting element is a second center axis, and viewed from a direction perpendicular to a plane including the first center axis and the second center axis, an optical axis of the relay lens is disposed at a position separated from the second center axis such that a principal ray of the diffusely reflected light coincides with a principal ray of the third light bundle.

7. The projector according to claim 4, further comprising:

a field lens disposed between the second reflecting element and the first light modulation device, wherein the second reflecting element is disposed so that the principal ray of the diffusely reflected light having been reflected by the second reflecting element coincides with an optical axis of the field lens.

8. The projector according to claim 5, further comprising:

a field lens disposed between the second reflecting element and the first light modulation device, wherein the second reflecting element is disposed so that the principal ray of the diffusely reflected light having been reflected by the second reflecting element coincides with an optical axis of the field lens.

9. The projector according to claim 6, further comprising:

a field lens disposed between the second reflecting element and the first light modulation device, wherein the second reflecting element is disposed so that the principal ray of the diffusely reflected light having been reflected by the second reflecting element coincides with an optical axis of the field lens.

10. A projector comprising:

the light source device according to claim 1;

an image forming section provided with a plurality of light modulation devices, and adapted to modulate illumination light emitted from the light source device in accordance with image information to form image light;

an overlapping optical system disposed in a light path between the light source device and the image forming section, and adapted to overlap the illumination light on each of the light modulation devices;

a color separation optical system disposed between the overlapping optical system and the image forming section, and adapted to separate the diffusely reflected light from the illumination light having passed through the overlapping optical system;

a relay optical system adapted to guide the diffusely reflected light having been separated by the color separation optical system to a first light modulation device out of the plurality of light modulation devices; and a projection optical system adapted to project the image light, wherein the relay optical system includes
  a third lens array,
  a fourth lens array to which the diffusely reflected light having been transmitted through the third lens array is input, and
  a field lens adapted to guide the diffusely reflected light having been transmitted through the fourth lens array to the first light modulation device.

11. A projector comprising:

the light source device according to claim 2;

an image forming section provided with a plurality of light modulation devices, and adapted to modulate illumination light emitted from the light source device in accordance with image information to form image light;

an overlapping optical system disposed in a light path between the light source device and the image forming section, and adapted to overlap the illumination light on each of the light modulation devices;

a color separation optical system disposed between the overlapping optical system and the image forming section, and adapted to separate the diffusely reflected light from the illumination light having passed through the overlapping optical system;

a relay optical system adapted to guide the diffusely reflected light having been separated by the color separation optical system to a first light modulation device out of the plurality of light modulation devices; and a projection optical system adapted to project the image light, wherein the relay optical system includes
  a third lens array,
  a fourth lens array to which the diffusely reflected light having been transmitted through the third lens array is input, and
  a field lens adapted to guide the diffusely reflected light having been transmitted through the fourth lens array to the first light modulation device.

12. A projector comprising:

the light source device according to claim 3;

an image forming section provided with a plurality of light modulation devices, and adapted to modulate illumination light emitted from the light source device in accordance with image information to form image light;

an overlapping optical system disposed in a light path between the light source device and the image forming section, and adapted to overlap the illumination light on each of the light modulation devices;

a color separation optical system disposed between the overlapping optical system and the image forming section, and adapted to separate the diffusely reflected light from the illumination light having passed through the overlapping optical system;

a relay optical system adapted to guide the diffusely reflected light having been separated by the color separation optical system to a first light modulation device out of the plurality of light modulation devices; and a projection optical system adapted to project the image light, wherein the relay optical system includes
  a third lens array,
  a fourth lens array to which the diffusely reflected light having been transmitted through the third lens array is input, and
  a field lens adapted to guide the diffusely reflected light having been transmitted through the fourth lens array to the first light modulation device.

13. The projector according to claim 10, wherein the first light modulation device includes an image forming area, and the field lens is disposed so that a principal ray of the diffusely reflected light having been transmitted through the field lens coincides with a center of the image forming area.

14. The projector according to claim 11, wherein the first light modulation device includes an image forming area, and the field lens is disposed so that a principal ray of the diffusely reflected light having been transmitted through the field lens coincides with a center of the image forming area.

15. The projector according to claim 12, wherein the first light modulation device includes an image forming area, and the field lens is disposed so that a principal ray of the diffusely reflected light having been transmitted through the field lens coincides with a center of the image forming area.

* * * * *